United States Patent
Magata

(10) Patent No.: US 8,675,265 B2
(45) Date of Patent: Mar. 18, 2014

(54) IMAGE READING APPARATUS

(75) Inventor: Shoko Magata, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 13/286,626

(22) Filed: Nov. 1, 2011

(65) Prior Publication Data

US 2012/0120460 A1  May 17, 2012

(30) Foreign Application Priority Data

Nov. 17, 2010 (JP) ................................. 2010-257145

(51) Int. Cl.
*H04N 1/04* (2006.01)

(52) U.S. Cl.
USPC ............. 358/474; 355/75; 355/133; 399/380; 358/488; 358/497

(58) Field of Classification Search
CPC ............................... G06G 15/605; H04N 1/10
See application file for complete search history.

(56) References Cited

U.S. PATENT DOCUMENTS

| | | | |
|---|---|---|---|
| 7,463,392 B2 | 12/2008 | Yamamoto et al. | 358/496 |
| 7,515,312 B2 | 4/2009 | Murakami et al. | 358/461 |
| 7,755,812 B2 | 7/2010 | Oshida et al. | 358/496 |
| 8,064,105 B2 | 11/2011 | Murakami et al. | 358/461 |
| 2002/0191996 A1* | 12/2002 | Nishikino et al. | 399/380 |

FOREIGN PATENT DOCUMENTS

JP  2006-67051  3/2006

* cited by examiner

*Primary Examiner* — Houshang Safaipour
*Assistant Examiner* — Idowu O Osifade
(74) *Attorney, Agent, or Firm* — Fitzpatrick, Cella, Harper & Scinto

(57) ABSTRACT

An image reading apparatus, including: a placement portion on which an original is to be placed; an openable and closable pressure portion which presses, the original, which is placed on the placement portion, against the placement portion; a reading unit which moves in a sub-scanning direction orthogonal to a main scanning direction to read image information of the original, which is pressed against the placement portion by the openable and closable pressure portion, and a step portion, which is provided in a pressure surface of the openable and closable pressure portion which presses the original against the placement stand, and in a state in which the openable and closable pressure portion is closed, forms a space portion extending in the sub-scanning direction so as to communicate to at least one end in the sub-scanning direction.

12 Claims, 4 Drawing Sheets

IMAGE READING APPARATUS

BACKGROUND OF THE INVENTION

1. Field of the Invention

The present invention relates to an image reading apparatus which reads an image on an original.

2. Description of the Related Art

An image reading apparatus reads an image by irradiating an original with original-reading illumination light emitted by a light source, and condensing the reflected light from the original to form an image on a photoelectric transduction unit. Therefore, in order that the image reading apparatus read the original accurately, it is necessary to bring the original into close contact with a placement stand glass plate so that the illumination light is reflected accurately.

In order to bring the original into close contact with the placement stand glass plate, it is necessary to prevent uplift of the original by bringing an original pressure plate, which presses the original, into close contact with the placement stand glass plate on which the original is placed. However, when the original pressure plate is brought into close contact with the placement stand glass plate, the original pressure plate may stick to the placement stand glass plate. In a case of an openable and closable original pressure plate, for example, when the original pressure plate is opened about a fulcrum shaft, a gripping portion, which is formed for lifting the original pressure plate, may be damaged.

To address this problem, there is disclosed an image reading apparatus in which close-contact releasing members configured to release the close contact between the original pressure plate and the placement stand glass plate are provided between the original pressure plate and the placement stand glass plate, thereby reducing the close contact between the original pressure plate and the placement stand glass plate when the original pressure plate is lifted (Japanese Patent Application Laid-Open No. 2006-67051).

However, in the image reading apparatus disclosed in Japanese Patent Application Laid-Open No. 2006-67051, when an original having, for example, a curl, fold, or waviness is placed on the original stand glass plate and is pressed by the original pressure plate, uplift of the original occurs by an amount corresponding to a difference in height between the close-contact releasing members and the original stand glass plate. Consequently, the close contact of the original is not maintained, resulting in a distortion occurring in an image obtained through the reading. Such an image distortion tends to be more conspicuous at end portions in a main scanning direction, which have the largest field angle. In addition, as the image reading apparatus is further downsized, an optical path length becomes shorter, and the end portions are disadvantageous for the uplift of the original because of the field angle.

SUMMARY OF THE INVENTION

It is an object of the present invention to provide an image reading apparatus which suitably suppresses uplift of an original to reduce degradation of an image in addition to suppressing sticking of a pressure portion to a placement portion.

The present invention provides an image reading apparatus, including: a placement portion on which an original is to be placed; an openable and closable pressure portion which presses the original, which is placed on the placement portion, against the placement portion; a reading unit which moves in a sub-scanning direction orthogonal to a main scanning direction to read image information of the original, which is pressed against the placement portion by the openable and closable pressure portion; and a step portion which is provided on a pressure surface of the openable and closable pressure portion which presses the original against the placement portion, and in a state in which the openable and closable pressure portion is closed, forms a space portion extending in the sub-scanning direction so as to communicate to at least one end in the sub-scanning direction.

Further features of the present invention will become apparent from the following description of exemplary embodiments with reference to the attached drawings.

DESCRIPTION OF THE EMBODIMENTS

Figure 1:
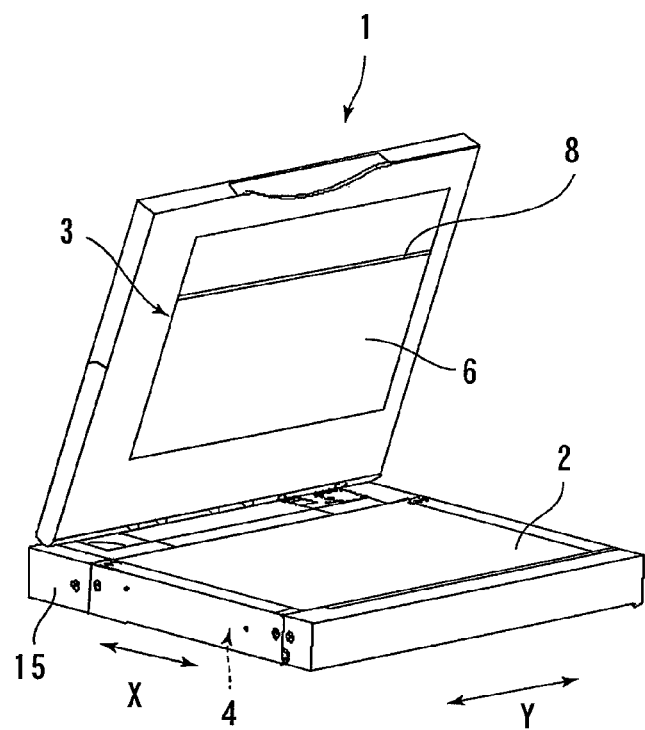
FIG. 1 is a perspective view illustrating an image reading apparatus according to an embodiment.
Figure 2:
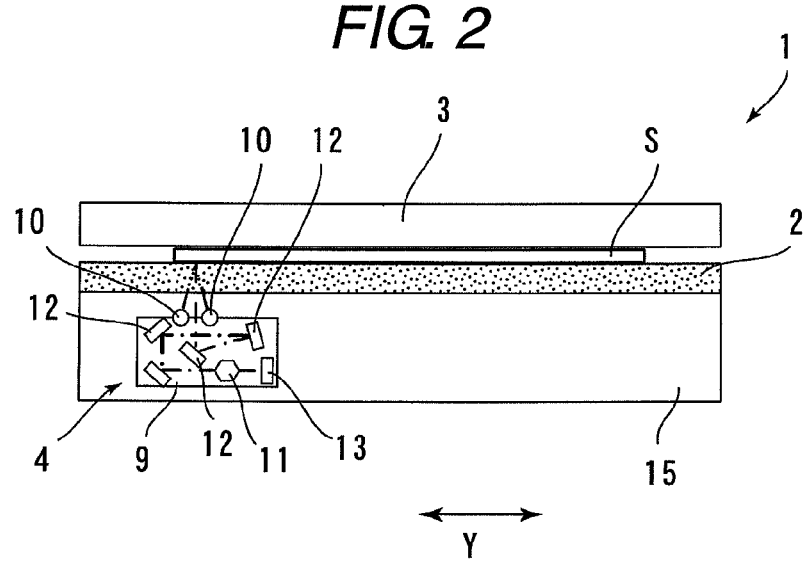
FIG. 2 is a sectional view illustrating an image reading portion of the image reading apparatus according to the embodiment.
Figure 3A:
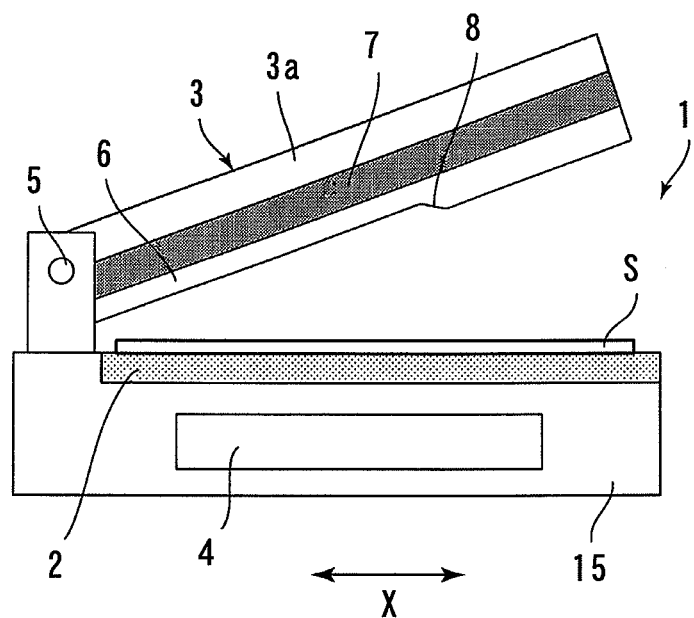
FIG. 3A is a view illustrating a state in which a pressure plate portion of the image reading apparatus according to the embodiment is opened.
Figure 3B:
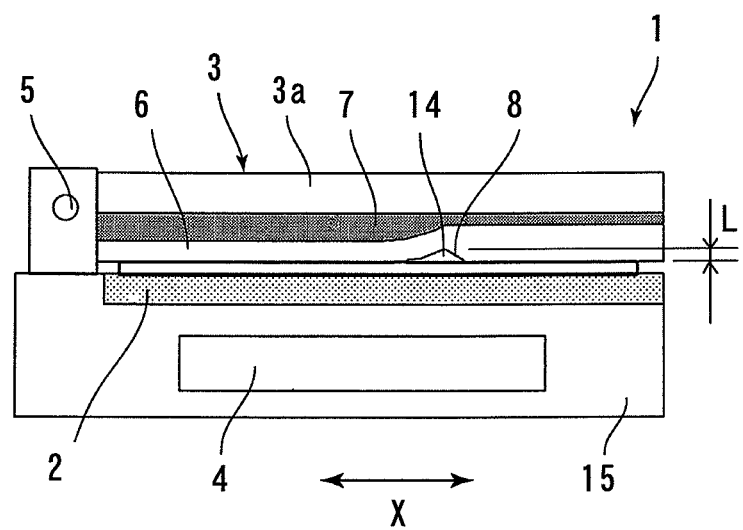
FIG. 3B is a view illustrating a state in which the pressure plate portion of FIG. 3A is closed.

Hereinafter, referring to FIGS. 1 to 3B, an image reading apparatus 1 according to an embodiment of the present invention will be described. FIG. 1 is a perspective view illustrating the image reading apparatus 1 according to the embodiment. FIG. 2 is a sectional view illustrating an image reading portion 4 of the image reading apparatus 1 according to the embodiment. FIG. 3A is a view illustrating a state in which a pressure plate portion (pressure portion) 3 of the image reading apparatus 1 according to the embodiment is opened. FIG. 3B is a view illustrating a state in which the pressure plate portion 3 of FIG. 3A is closed.

As illustrated in FIG. 1, the image reading apparatus 1 according to the embodiment includes: a placement stand glass plate (placement portion) 2 having a flat upper surface, on which an original S is to be placed; the pressure plate portion 3 which presses the placed original S against the placement stand glass plate 2; and the image reading portion 4 serving as a reading unit which reads image information on an original surface of the placed original S. Further, the image reading apparatus 1 includes a reading apparatus main body 15 which supports the placement stand glass plate 2 and contains the image reading portion 4.

As illustrated in FIG. 2, the image reading portion 4 is disposed below the placement stand glass plate 2. The image reading portion 4 includes: light source lamps 10 serving as a light emitting portion which irradiates the original S with light; an imaging lens 11 which reads the reflected light from the original S; a plurality of mirrors 12 which guide the reflected light to the imaging lens 11; and a line CCD 13 serving as a light receiving portion, which has photoelectric transducers arranged in line. The light source lamps 10, the imaging lens 11, the plurality of mirrors 12, and the line CCD 13 are integrally contained in an optical box 9 disposed below the placement stand glass plate 2.

The light source lamps 10 irradiate the original S placed on the placement stand glass plate 2 with light along a main scanning direction (corresponding to an X direction illustrated in FIG. 1, and hereinafter, referred to as "main scanning direction X"). The reflected light from the original S is reduced in the main scanning direction X by a reduction optics portion constituted by the plurality of mirrors 12 and the imaging lens 11, and enters the line CCD 13 disposed in the vicinity of the center in the main scanning direction X. The line CCD 13 performs photoelectric transduction on the reflected light which reflects the image information of the original S, and outputs the resultant as an electronic image signal. As described above, the image reading portion 4 includes the reduction optics portion which reduces the reflected light from the original in the main scanning direction X, and the line CCD 13 serving as a reading sensor which receives the light reduced by the reduction optics portion to read an image of the original.

Further, the image reading portion 4 is coupled to a motor (not shown) through a wire (not shown), and therefore movement of the image reading portion 4 is controlled in a sub-scanning direction (corresponding to a Y direction illustrated in FIG. 1, and hereinafter, referred to as "sub-scanning direction Y") orthogonal to the main scanning direction X through rotational drive of the motor. The image reading portion 4 moves in the sub-scanning direction Y through forward or reverse rotation of the motor, and therefore scans the original S placed on the placement stand glass plate 2 to read the image information of the original S.

As illustrated in FIGS. 3A and 3B, the pressure plate portion 3 is supported by the reading apparatus main body 15 through a hinge portion 5 so that the placement stand glass plate 2 is openable and closable. The pressure plate portion 3 includes a pressure plate portion main body 3a, a pressure portion 6 serving as an elastic portion which forms a pressure surface which presses the original S against the placement stand glass plate 2, and an elastically-deformable portion 7 serving as an elastic portion disposed between the pressure plate portion main body 3a and the pressure portion 6.

The pressure portion 6 is made of an elastically-deformable synthetic resin material (for example, an ABS resin), and includes a step portion 8 having an inclined surface that is inclined in the main scanning direction X and extends in the sub-scanning direction Y. The step portion 8 is shaped like an inclined surface at such an angle as to avoid shading due to the irradiation of the light source lamps 10. In the embodiment, the step portion is formed so that a step L of 0.4 mm in a thickness direction is provided. Further, the step portion 8 is formed at a position at which an angle ($\theta$) with respect to the vertical direction, at which the image information of the original S is read, satisfies the following expression with respect to the step (L):

$$L \cdot \tan \theta < 20 \ \mu m$$

Further, the step portion 8 is formed throughout a range between both ends of the pressure portion 6 in the sub-scanning direction Y, and both sides of the step portion 8 in the main scanning direction X (with the step portion 8 marking the border between the both sides in the main scanning direction X) are shaped like a flat surface parallel to the placement stand glass plate 2 so as to come into close contact with the placement stand glass plate 2.

As illustrated in FIG. 3B, when the pressure plate portion 3 openably and closably supported through the hinge portion 5 is closed toward the placement stand glass plate 2, the pressure portion 6 comes into contact with the placement stand glass plate 2 so that the step portion 8 elastically deforms, thereby forming a predetermined space portion 14 between the pressure portion 6 and the placement stand glass plate 2. At this time, the both sides in the main scanning direction X with the step portion 8 marking the border are shaped into flat surfaces, and hence come into close contact with the placement stand glass plate 2. In other words, in the state in which the pressure plate portion 3 is closed, portions of the pressure surface of the pressure plate portion 3 on both sides with the space portion 14 marking the border are both shaped into flat surfaces conforming to the placement stand glass plate 2 so that the original placed on the placement stand glass plate 2 can be pressed against the placement stand glass plate 2.

The elastically-deformable portion 7 is made of an elastically-deformable synthetic resin material (for example, a urethane resin), and when the step portion 8 comes into contact with the placement stand glass plate 2 to elastically deform, the elastically-deformable portion 7 is pressed by the step portion 8 to elastically deform. In other words, the elastically-deformable portion 7 serves as a cushion which assists the elastic deformation of the pressure portion 6 so that the step portion 8 forms the space portion 14 with ease.

Next, referring to FIGS. 3A and 3B, the elastic deformation of the pressure portion 6 which causes the step portion 8 to form the space portion 14 will be described. As illustrated in FIG. 3A, the pressure plate portion 3 openably and closably supported through the hinge portion 5 maintains, in the opened state, a difference in height (step) in the pressure surface of the pressure portion 6 due to the step portion 8. On the other hand, as illustrated in FIG. 3B, in the closed state, the pressure portion 6 deforms due to a reaction force caused by the collapse of the elastically-deformable portion 7 and a pressing force from the placement stand glass plate 2, and therefore portions of the pressure portion 6 on both sides in the main scanning direction X with the step portion 8 marking the border between the portions come into close contact with the original S. At this time, the step portion 8 elastically deforms due to the reaction force caused by the collapse of the elastically-deformable portion 7 and the pressing force from the placement stand glass plate 2, but does not come into close contact with the original S. Thus, the deformed step portion 8 forms the predetermined space portion 14.

Figure 4:
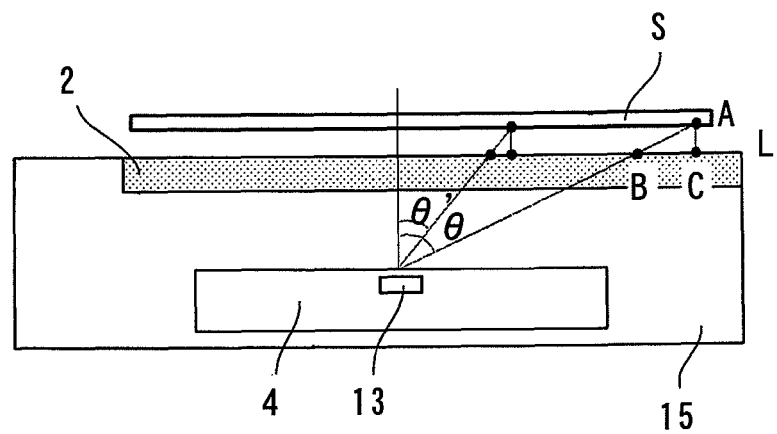
FIG. 4 is a view illustrating a relationship between a field angle and an image distortion in the image reading apparatus according to the embodiment.

Now, referring to FIG. 4, a relationship between an image distortion and an angle (hereinafter, referred to as "field angle ($\theta$)") with respect to the vertical direction, at which angle the image information of the original S is read, will be described. FIG. 4 is a view illustrating the relationship between the field angle and the image distortion in the image reading apparatus 1 according to the embodiment.

On the original S illustrated in FIG. 4, a straight line is drawn at a position A toward the sub-scanning direction Y, and the original S is wavy at an end portion (an end portion on the side of the position A) in the main scanning direction X. As illustrated in FIG. 4, the field angle at the time of reading the straight line drawn at the position A on the original S which is uplifted from the placement stand glass plate 2 is $\theta$. When the position A is converted into a position on the surface of the placement stand glass plate at the same field angle $\theta$, the straight line drawn at the position A is recognized to be located at a position B. On the other hand, at a position of the straight line at which the original S is not uplifted, the position A is recognized to be located at a position C. In other words, an apparent deviation of B-C occurs between the position A at the portion at which the original S is uplifted and the position A at the portion at which the original S is not uplifted, and hence an image of the straight line obtained through the reading shows a wavy line having a width of B-C in plan view.

Further, as illustrated in FIG. 4, the width of B-C is larger at the position at which the field angle is θ than at a position at which the field angle is θ'. In other words, even in the case of the same uplift amount, the value of B-C becomes larger toward the end portion in the main scanning direction X, with the result that the straight line is recognized as a wavy line having a large amplitude. Therefore, when the original S is uplifted in the vicinity of the end portion of the original S in the main scanning direction X, the image distortion becomes more conspicuous.

When the width of the wavy line is, for example, 20 (μm) or less, human eyes do not recognize the line as a wavy line but may recognize as a straight-line shape. Therefore, even when the original S is uplifted by a predetermined amount, there is no problem with image quality as long as the original S is uplifted at a position at which the value of θ satisfies the following expression:

$$B-C=L \cdot \tan \theta < 20 \ \mu m,$$

where L represents an uplift amount of the original S (=height of the step). Thus, as long as the step portion 8 is provided at the above-mentioned position, even when the original is uplifted at the space portion 14 formed by the step portion 8, for example, no image distortion occurs in view of the field angle, and accordingly the image quality is maintained.

According to the image reading apparatus 1 of the embodiment that is structured as described above, the following effects are produced. The image reading apparatus 1 includes the elastically-deformable portion 7 and the pressure portion 6 having the step portion 8. Therefore, in the closed state, the pressure portion 6 deforms due to the reaction force caused by the collapse of the elastically-deformable portion 7, and hence both end portions of the original S in the main scanning direction X (regions on both end sides in the main scanning direction) are suitably pressed against the placement stand glass plate 2. Further, in the image reading apparatus 1, both sides in the main scanning direction X with the step portion 8 marking the border between the both sides are shaped into flat surfaces, and hence the end portions of the original S in the main scanning direction X (regions on both end sides in the main scanning direction X) can suitably be pressed against (brought into close contact with) the placement stand glass plate 2.

Further, by providing the step portion 8, the space portion 14 can be formed between the pressure portion 6 and the placement stand glass plate 2. Because the space portion 14 is formed in the pressure plate portion 3 in the closed state, when the pressure plate portion 3 is brought into the opened state, air easily flows into the space between the placement stand glass plate 2 and the pressure portion 6 from the end portions of the step portion 8 in the sub-scanning direction Y. Accordingly, when the pressure plate portion 3 is opened, it is possible to suppress sticking of the pressure plate portion 3 to the placement stand glass plate 2 and damage to the pressure plate portion 3 due to the close contact between the placement stand glass plate 2 and the pressure portion 6.

Further, in the embodiment, as the pressure plate portion 3 is opened, the pressure portion 6 deforms so as to try to return into its original shape, and therefore the space portion 14 becomes larger. As a result, air flows into the space portion more easily, and thus the sticking of and damage to the pressure plate portion 3 due to the close contact can be prevented more suitably.

Hereinabove, the embodiment of the present invention has been described, but the present invention is not limited to the above-mentioned embodiment. Further, the effects described in the embodiment of the present invention are merely exemplified as the most suitable effects produced by the present invention, and hence the effects produced by the present invention are not limited to the effects described in the embodiment of the present invention.

For example, the embodiment has been described by using the step portion 8 extending in parallel to the sub-scanning direction Y, but the present invention is not limited thereto. The step portion only needs to extend in the sub-scanning direction Y, and may extend in a state of forming an angle with respect to the sub-scanning direction Y instead of extending in parallel to the sub-scanning direction Y. Further, the step portion is not limited to the step portion extending in a straight-line shape, and for example, may be a step portion formed into a curved-line shape in plan view.

Figure 5A:
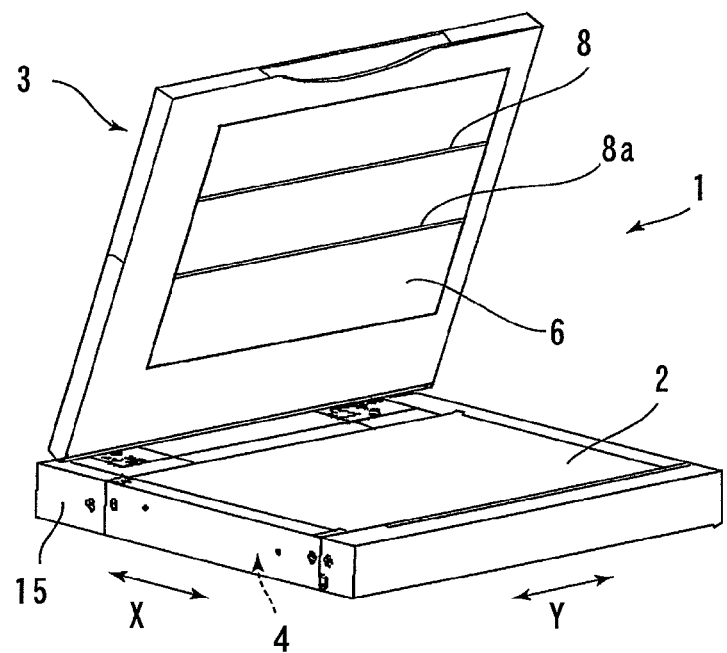
FIG. 5A is a perspective view illustrating an image reading apparatus according to another embodiment.

Further, in the embodiment, the step portion 8 formed throughout the range between both ends in the sub-scanning direction Y is provided at one location, but the present invention is not limited thereto. For example, as illustrated in FIG. 5A, step portions 8a extending in the sub-scanning direction Y may be provided at two locations. As illustrated in FIG. 5A, in the state in which the pressure plate portion 3 is closed, a portion between the two step portions 8a does not come into contact with the placement stand glass plate 2, and therefore the space portion 14 is formed between the portion and the placement stand glass plate 2. Because the space portion 14 communicates to the ends in the sub-scanning direction Y, when the pressure plate portion 3 is opened, air flows into the space portion 14 from the end portions in the sub-scanning direction Y. Accordingly, the sticking of the pressure plate portion 3 to the placement stand glass plate 2 can be prevented.

Note that, there may be employed a structure in which the portion between the two step portions 8a does not deform due to the reaction force of the elastically-deformable portion 7 at the time when the pressure plate portion 3 is closed. However, it is even preferred to employ the structure in which the portion between the two step portions 8a deforms due to the reaction force of the elastically-deformable portion 7. This is because, similarly to the above-mentioned embodiment, a larger amount of air flows into the space portion 14 as the pressure plate portion 3 is opened.

Figure 6:
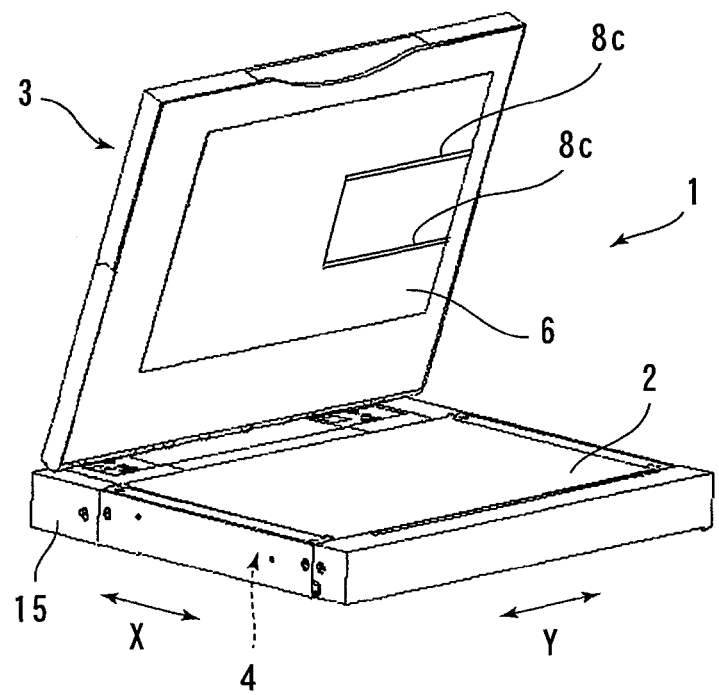
FIG. 6 is a perspective view illustrating an image reading apparatus according to still another embodiment.
Figure 5B:
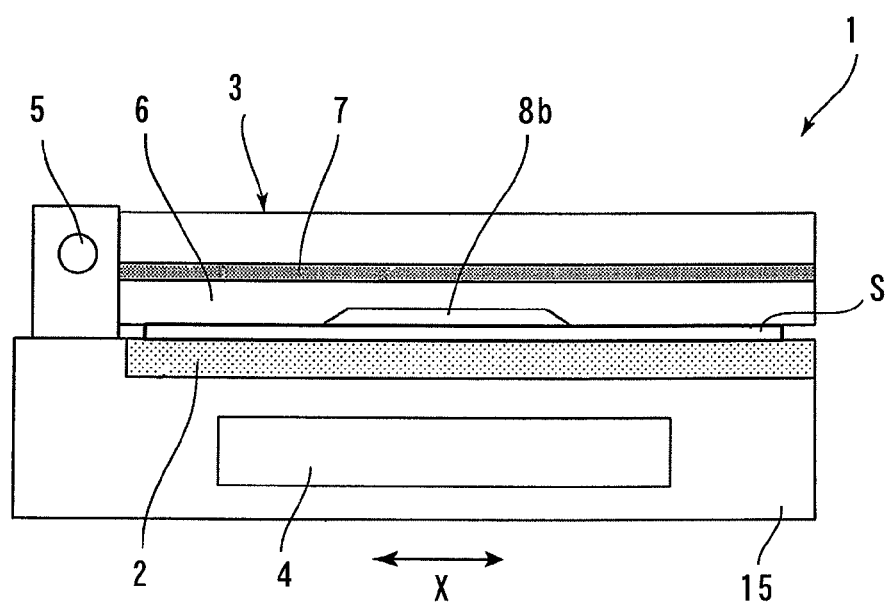
FIG. 5B is a sectional view of FIG. 5A in a state in which a pressure plate portion is closed.

Further, as illustrated in FIG. 5B, a groove-like recessed step portion 8b may be provided. Further, as illustrated in FIG. 6, steps 8c communicating toward only one end may be provided instead of the step portion formed throughout the range between both ends in the sub-scanning direction Y.

In the embodiment, the step portion which forms the space portion extending in the sub-scanning direction is provided on the pressure plate portion 3, and thus it is possible to suppress the sticking of the pressure plate portion 3 to the placement stand glass plate 2 and, at the same time, suitably suppress the uplift of the original from the placement stand glass plate 2 to reduce degradation of the image.

Further, the embodiment has described the pressure plate portion 3 in the form with only the function of pressing the original S, but the present invention is not limited thereto. The pressure plate portion may be formed integrally with, for example, an automatic document feeder (ADF), and the integrally formed product may serve as the pressure plate portion.

Further, the image reading apparatus 1 of the embodiment may be used by being incorporated into an image forming apparatus including an image forming portion which forms an image read by the image reading apparatus 1 on a sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-257145, filed Nov. 17, 2010, which is hereby incorporated by reference herein in its entirety.

What is claimed is:

1. An image reading apparatus comprising:
a placement portion on which an original is to be placed;
an openable and closable pressure portion which presses the original, which is placed on the placement portion, against the placement portion;
a reading unit which moves in a sub-scanning direction orthogonal to a main scanning direction to read image information of the original, which is pressed against the placement portion by the openable and closable pressure portion;
a step portion which is provided on a pressure surface of the openable and closable pressure portion which presses the original against the placement portion, the step portion forming a space portion between the pressure surface and the placement portion, the space portion extending along the sub-scanning direction so that at least one end of the space portion in the sub-scanning direction is communicated to an outside in a state in which the openable and closable pressure portion is closed; and
an elastic portion which is provided in the openable and closable pressure portion and forms the pressure surface, the elastic portion including the step portion and elastically deforming to form the space portion between the elastic portion and the placement portion in the state in which the openable and closable pressure portion is closed.

2. An image reading apparatus according to claim 1, wherein the step portion is formed throughout a range between both ends of the pressure surface of the openable and closable pressure portion in the sub-scanning direction.

3. An image reading apparatus according to claim 1, wherein the following expression is satisfied:

$$L \cdot \tan \theta < 20 \, \mu m,$$

where L represents a height of the space portion from the placement portion at a time when the openable and closable pressure portion is closed, and $\theta$ represents an angle formed by an intersection of a line perpendicular to the placement portion and passing through a sensor of the reading unit with a line joining the sensor of the reading unit and the space portion when the openable and closable pressure portion is closed.

4. An image reading apparatus according to claim 1, wherein the elastic portion comprises a resin plate, and the openable and closable pressure portion comprises a main body and a urethane cushion disposed between the main body and the elastic portion.

5. An image reading apparatus according to claim 4, wherein when the openable and closable pressure portion is closed, the urethane cushion is compressed, and the resin plate is deformed by resilience of the compressed urethane cushion.

6. An image reading apparatus, comprising:
a placement portion on which an original is to be placed;
an openable and closable pressure portion which presses the original, which is placed on the placement portion, against the placement portion;
a reading unit which moves in a sub-scanning direction orthogonal to a main scanning direction to read image information of the original, which is pressed against the placement portion by the openable and closable pressure portion;
a step portion which is provided on a pressure surface of the openable and closable pressure portion which presses the original against the placement portion, the step portion forming a space portion between the pressure surface and the placement portion, the space portion extending along the sub-scanning direction to at least one end of the pressure surface in the sub-scanning direction in a state in which the openable and closable pressure portion is closed,
wherein the following expression is satisfied:

$$L \cdot \tan \theta < 20 \, \mu m,$$

where L represents a height of the space portion from the placement portion at a time when the openable and closable pressure portion is closed, and $\theta$ represents an angle formed by an intersection of a line perpendicular to the placement portion and passing through a sensor of the reading unit with a line joining the sensor of the reading unit and the space portion when the openable and closable pressure portion is closed.

7. An image reading apparatus, comprising:
a placement portion on which an original is to be placed;
an openable and closable pressure portion which presses the original, which is placed on the placement portion, against the placement portion;
a reading unit which moves in a sub-scanning direction orthogonal to a main scanning direction to read image information of the original, which is pressed against the placement portion by the openable and closable pressure portion; and
an elastic portion which is provided in the openable and closable pressure portion and presses the original against the placement portion, the elastic portion elastically deforming and including a step portion to form a space portion between the elastic portion and the placement portion, the space portion extending along the sub-scanning direction to at least one end of the openable and closable pressure portion in the sub-scanning direction when the openable and closable pressure portion is closed.

8. An image reading apparatus according to claim 7, wherein the step portion is formed throughout a range between both ends of the openable and closable pressure portion in the sub-scanning direction.

9. An image reading apparatus according to claim 7, wherein the following expression is satisfied:

$$L \cdot \tan \theta < 20 \, \mu m,$$

where L represents a height of the space portion from the placement portion at a time when the openable and closable pressure portion is closed, and $\theta$ represents an angle formed by an intersection of a line perpendicular to the placement portion and passing through a sensor of the reading unit with a line joining the sensor of the reading unit and the space portion when the openable and closable pressure portion is closed.

10. An image reading apparatus according to claim 7, wherein the elastic portion comprises a resin plate, and the openable and closable pressure portion comprises a main body and a urethane cushion disposed between the main body and the elastic portion.

11. An image reading apparatus according to claim 10, wherein when the openable and closable pressure portion is closed, the urethane cushion is compressed, and the resin plate is deformed by resilience of the compressed urethane cushion.

12. An image reading apparatus according to claim 1, wherein said at least one end of the space portion is communicated to an outside of the pressure surface of the openable and closable pressure portion.

* * * * *